United States Patent
Zhong et al.

(10) Patent No.: US 11,243,411 B2
(45) Date of Patent: Feb. 8, 2022

(54) 3D DISPLAY SYSTEM

(71) Applicant: ASUSTeK COMPUTER INC., Taipei (TW)

(72) Inventors: Xian Zhong, Taipei (TW); Wen-Chang Hung, Taipei (TW)

(73) Assignee: ASUSTEK COMPUTER INC., Taipei (TW)

( * ) Notice: Subject to any disclaimer, the term of this patent is extended or adjusted under 35 U.S.C. 154(b) by 143 days.

(21) Appl. No.: 16/713,088

(22) Filed: Dec. 13, 2019

(65) Prior Publication Data

US 2020/0201068 A1 Jun. 25, 2020

(30) Foreign Application Priority Data

Dec. 21, 2018 (TW) ................. 107217478

(51) Int. Cl.
*G02B 30/56* (2020.01)

(52) U.S. Cl.
CPC ................. *G02B 30/56* (2020.01)

(58) Field of Classification Search
CPC ........ G02B 27/0172; G02B 2027/0138; G02B 2027/014; G02B 2027/0187; G02B 7/005; G02B 30/00; G02B 30/56; G02B 27/0093

USPC ................................................ 359/478
See application file for complete search history.

(56) References Cited

U.S. PATENT DOCUMENTS

| 2007/0097319 A1* | 5/2007 | McKay | H04N 13/38 |
| | | | 353/7 |
| 2016/0278695 A1* | 9/2016 | Wang | G02B 23/2461 |

FOREIGN PATENT DOCUMENTS

| CN | 102436169 A | 5/2012 |
| CN | 105589293 A | 5/2016 |

* cited by examiner

*Primary Examiner* — Jade R Chwasz
(74) *Attorney, Agent, or Firm* — McClure, Qualey & Rodack, LLP

(57) ABSTRACT

A 3D display system includes a rotational base, a 3D projecting device, an image capturing device, and a controller. The 3D projecting device is rotatably disposed on the rotational base. The image capturing device is disposed on the 3D projecting device. The controller is electrically connected to the image capturing device, the rotational base, and the 3D projecting device.

9 Claims, 5 Drawing Sheets

3D DISPLAY SYSTEM

CROSS-REFERENCE TO RELATED APPLICATION

This application claims the priority benefit of Taiwan Application Serial No. 107217478, filed on Dec. 21, 2018. The entirety of the above-mentioned patent application is hereby incorporated by reference herein and made a part of the specification.

BACKGROUND OF THE INVENTION

Field of the Invention

The disclosure relates to a 3D display system.

Description of the Related Art

Currently, holographic technologies develop rapidly around the world due to technological innovations, using approaches ranging from basic holographic-like effects to the use of semiconductor microstructures. These approaches are for example the floating holographic-like effects with fixed projection directions and more complex 360-degree holographic projection technologies. Among them, the 360-degree holographic projection technologies are difficult to implement is not suitable for mass production.

BRIEF SUMMARY OF THE INVENTION

According to the first aspect of the disclosure, a 3-Dimensional (3D) display system is provided. The 3D display system includes: a rotational base; a 3D projecting device rotatably disposed on the rotational base; an image capturing device, disposed on the 3D projecting device; and a controller, electrically connected to the image capturing device, the rotational base, and the 3D projecting device. Based on the above, the 3D display system of the disclosure allows a viewer to view a 3D image in 360 degrees, and the architecture of the 3D display system is compatible with various existing 3D projecting devices, offering the advantages of low costs and easy installation. In addition, the 3D display system adjusts an optimal elevation angle according to the viewer's height, providing an optimal effect for the viewer viewing the image.

DETAILED DESCRIPTION OF THE EMBODIMENTS

Figure 1:
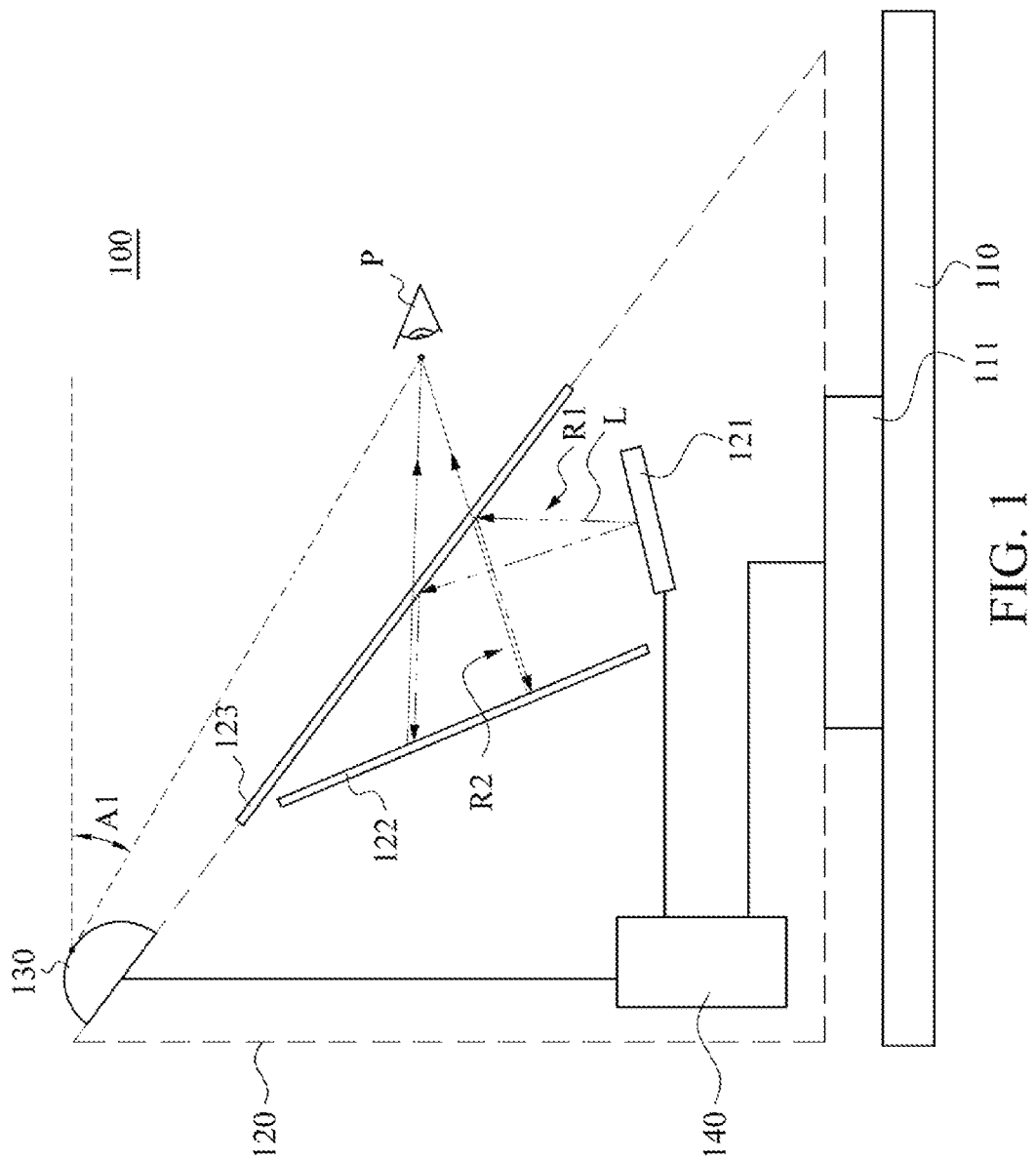
FIG. 1 is a schematic diagram of a 3D display system according to an embodiment of the present disclosure.

Embodiments of the disclosure will be disclosed with reference to drawings. For clarity of description, many practical details will be explained together in the following description. However, it is to be appreciated that the practical details are not intended to limit the disclosure. In other words, the practical details are not necessary in some embodiments of the disclosure. In addition, for brevity of illustration, some customary structures and elements are shown in the drawings in a simple, schematic way. Unless otherwise indicated, the same reference numerals in different drawings are used to refer to the same or like elements. The drawings are provided only for the purpose of clearly explaining the connection relationships between elements in the embodiments and are not necessarily drawn to scale.

FIG. 1 is a schematic diagram of a 3-Dimensional (3D) display system 100 according to an embodiment of the disclosure. As shown in FIG. 1, the 3D display system 100 includes a rotational base 110, a 3D projecting device 120, an image capturing device 130, and a controller 140. The 3D projecting device 120 is rotatably disposed on the rotational base 110. The image capturing device 130 is disposed above the 3D projecting device 120 (i.e., at the top of the entire 3D display system 100). The controller 140 electrically is connected to the rotational base 110, the 3D projecting device 120, and the image capturing device 130.

As shown in FIG. 1, in an embodiment, the rotational base 110 supports the 3D projecting device 120 located thereon. In an embodiment, the rotational base 110 includes a rotary column 111. The rotational base 110 is connected to the 3D projecting device 120 through the rotary column 111. The 3D projecting device 120 is rotatable relative to the rotational base 110 by the rotary column 111. The above embodiments are only examples and are not intended to limit the disclosure. It is feasible to use any type of pivoting mechanism to cause the 3D projecting device 120 to rotate.

As shown in FIG. 1, the 3D projecting device 120 is a reflective 3D projecting device. In this embodiment, the 3D projecting device 120 includes a housing (denoted by dashed lines in FIG. 1), and a displayer 121, an optical lens 122, and a polarizer 123 disposed inside the housing. The displayer 121, the optical lens 122, and the polarizer 123 define a triangular space. In this embodiment, the polarizer 123 covers the displayer 121 and the optical lens 122. In this embodiment, the controller 140 is also disposed inside the housing of the 3D projecting device 120.

As shown in FIG. 1, the displayer 121 emits light L toward the polarizer 123. The light L is transmitted along a first light transport direction R1, and the polarizer 123 is designed to reflect the light L with the first light transport direction R1. Therefore, the light L is reflected when reaching the polarizer 123. The light L is reflected by the polarizer 123 to the optical lens 122. In an embodiment, the optical lens 122 changes the light transport direction of the light L and reflect the light L back along a path opposite to the incident path of the light L. When the light L reaches the optical lens 122, the light transport direction is changed from the first light transport direction R1 to a second light transport direction R2. In this embodiment, the light L with the second light transport direction R2 passes through the polarizer 123 and reaches a viewer P outside the 3D projecting device 120.

In other words, the light L passes through the polarizer 123, the optical lens 122, and the polarizer 123 in sequence, and finally reaches the viewer P. When looking toward the polarizer 123, the viewer P observes a virtual image formed behind the polarizer 123 by the light L. In this way, a plurality of beams of light L emitted by the displayer 121 presents a 3D floating image behind the polarizer 123.

As shown in FIG. 1, the image capturing device 130 and the polarizer 123 face toward the same direction. In this embodiment, the image capturing device 130 and the polarizer 123 of the 3D projecting device 120 are located in the same plane. In other embodiments, the image capturing device 130 and the polarizer 123 of the 3D projecting device 120 are located in different planes. In this embodiment, the image capturing device 130 is configured to detect a first elevation angle A1 and a first viewing angle O1 between the viewer P and the 3D projecting device 120 (see FIG. 2A and FIG. 2B). Because the viewer P faces toward the polarizer 123 to view the 3D image projected by the 3D projecting device 120, the image capturing device 130 and the polarizer 123 are configured to face toward the same direction ensures that the image capturing device 130 detects the viewer P located outside the 3D projecting device 120.

As shown in FIG. 1, the controller 140 rotates the 3D projecting device 120 through the rotational base 110 based on information detected by the image capturing device 130. For details, refer to FIG. 2A, which is a top view of the 3D display system 100 in FIG. 1. As shown in FIG. 2A, the image capturing device 130 detects that the viewer P is located on a cutting plane S perpendicular to the 3D projecting device 120 (where the first viewing angle O1 is 0 degrees, and therefore is denoted only by an arrow). The controller 140 controls the rotational base 110 to be fixed at an original position.

Figure 2B:
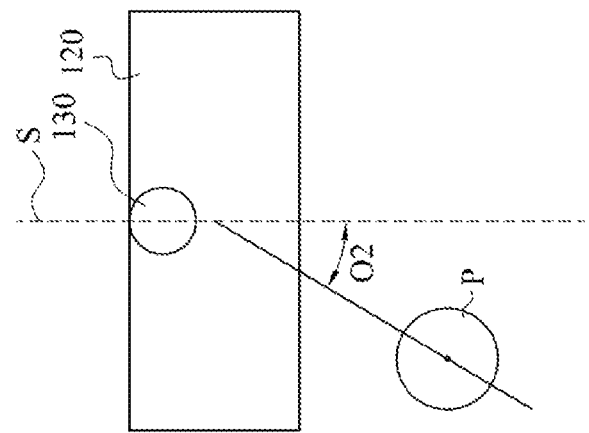
FIG. 2B is a top view of the 3D display system in FIG. 1.
Figure 2A:
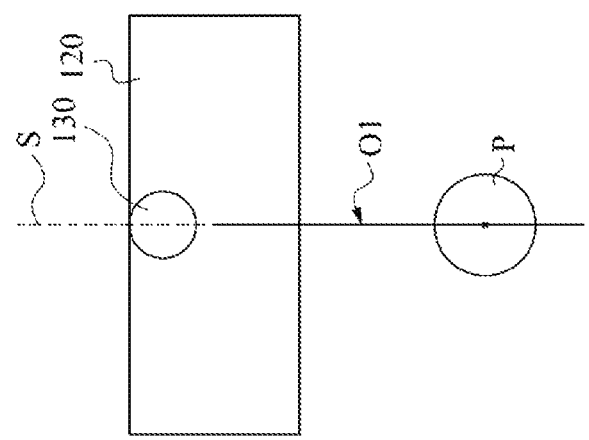
FIG. 2A is a top view of the 3D display system in FIG. 1.

Next, refer to FIG. 2B, which is a top view of the 3D display system 100 in FIG. 1. As shown in FIG. 2B, the image capturing device 130 detects a second viewing angle O2 of the viewer P on the left side of the plane S. In this embodiment, the controller 140 controls the rotational base 110 to rotate so that the plane S is aligned with the viewer P.

As shown in FIG. 2A and FIG. 2B, when the viewer P walks around the 3D display system 100, the 3D display system 100 actively aligns the center of the 3D projecting device 120 to the perspective of the viewer P according to the position of the viewer P. In this way, the viewer P views, in all directions, the 3D image presented inside the 3D projecting device 120.

In this embodiment, the controller 140 further controls the displayer 121 to present different images according to the position of the viewer P detected by the image capturing device 130. In an embodiment, when the viewer P is at the first viewing angle O1 in FIG. 2A, the controller 140 controls the displayer 121 to present an image of a 3D object obtained when viewing at the first viewing angle O1. When the viewer P is located at the second viewing angle O2 in FIG. 2B, the controller 140 controls the displayer 121 to present an image of the 3D object obtained when viewing at the second viewing angle O2.

Based on the above, the 3D display system of the disclosure allows the viewer to view a 3D image in 360 degrees, and the architecture of the 3D display system is compatible with various existing 3D projecting devices, offering the advantages of low costs and easy installation.

Figure 3:
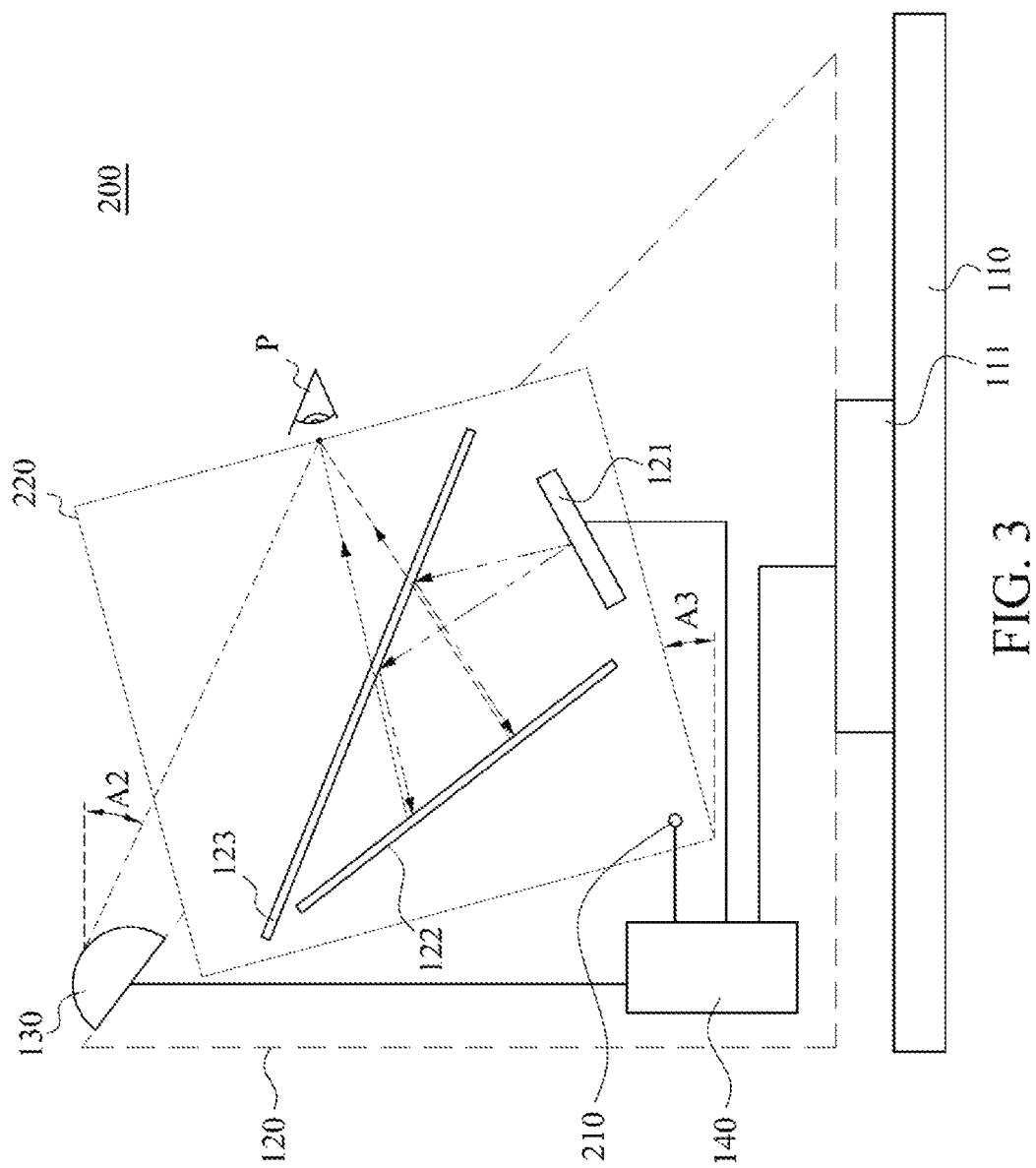
FIG. 3 is a schematic diagram of a 3D display system according to another embodiment of the disclosure.

Next, refer to FIG. 3, which is a schematic diagram of a 3D display system 200 according to another embodiment of the disclosure. The difference between the 3D display system 200 in FIG. 3 and the 3D display system 100 in FIG. 1 is that the 3D display system 200 further includes a pivoting mechanism 210. The pivoting mechanism 210 is electrically connected to the controller 140 and the displayer 121, the optical lens 122, and the polarizer 123 of the 3D projecting device 120. The pivoting mechanism 210 is configured to change positions of the displayer 121, the optical lens 122, and the polarizer 123 relative to the rotational base 110.

As shown in FIG. 3, in this embodiment, the displayer 121, the optical lens 122, and the polarizer 123 inside the 3D projecting device 120 are installed together inside a box 220. The box 220 is pivotally connected to the pivoting mechanism 210, to enable the box 220 to rotate along an axis of the pivoting mechanism 210. In an embodiment, the box 220 moves relative to the rotational base 110. As shown in FIG. 3, an angle A3 exists between a bottom surface of the box 220 and a horizontal plane. When the box 220 rotates along the pivoting mechanism 210, the angle A3 changes.

As shown in FIG. 3, after the box 220 rotates, the first elevation angle A1 shown in FIG. 1 changes. In an embodiment, in FIG. 3, a second elevation angle A2 exists between the viewer P and the image capturing device after the box 220 rotates counterclockwise. In this way, the pivoting mechanism 210 controls the optimal elevation angle of the 3D display system 100.

As shown in FIG. 3, the image capturing device 130 detects the first elevation A1 (see FIG. 1) between eyes of the viewer P and the plane in which the image capturing device 130 lies. The image capturing device 130 transmits elevation angle information to the controller 140. The controller 140 further controls the box 220 to rotate according to the received elevation angle information. Therefore, the viewers P of different heights to enjoy the optimal image quality. On the other hand, the 3D display system of the disclosure also enables the viewer P to enjoy the optimal image quality when standing, squatting or in other postures to view the 3D display system 100.

Figure 4A:
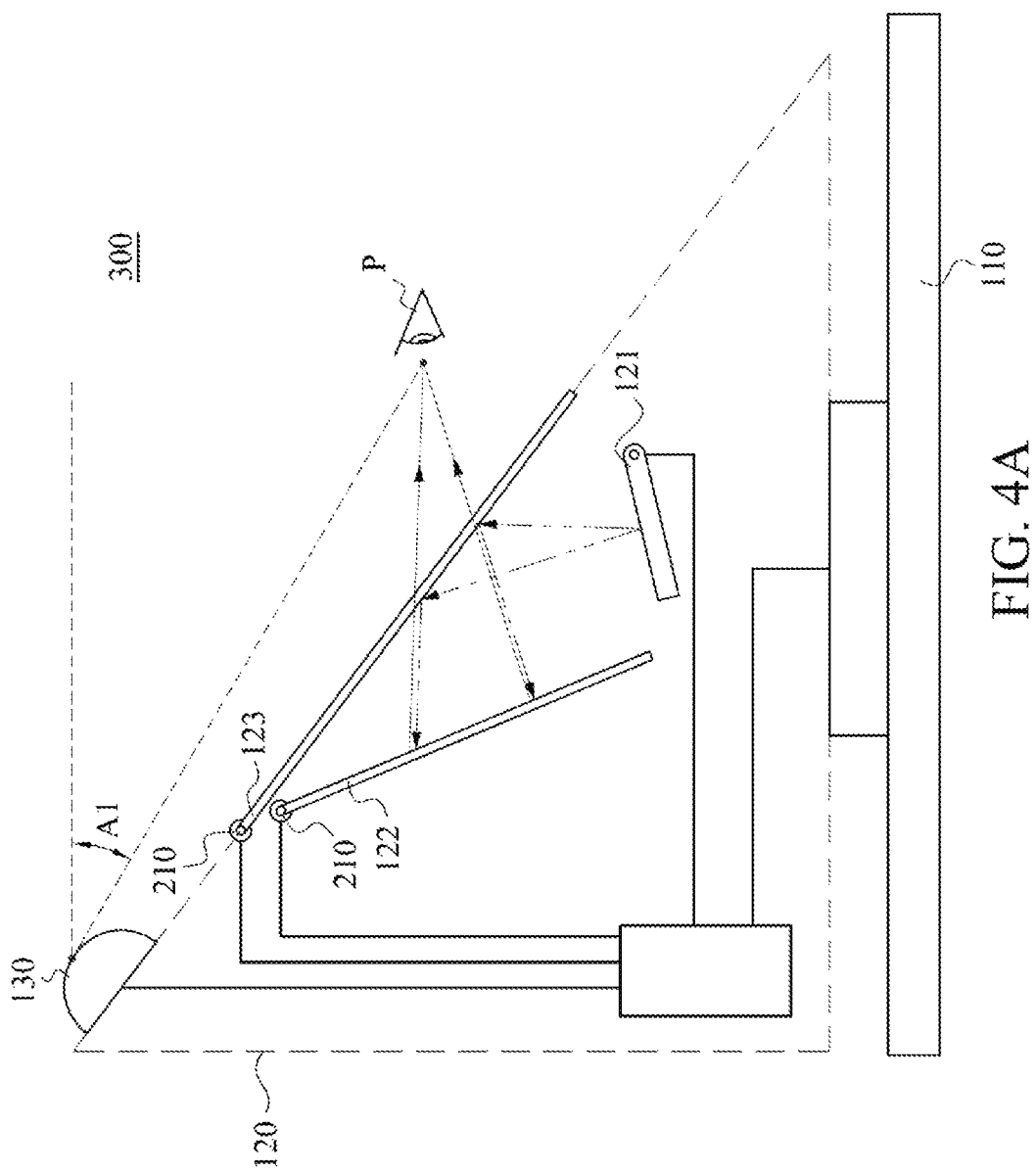
FIG. 4A is a schematic diagram of a 3D display system according to still another embodiment of the disclosure.

Next, refer to FIG. 4A, which is a schematic diagram of a 3D display system 300 according to still another embodiment of the disclosure. The difference between the 3D display system 300 and the 3D display system 200 is that the displayer 121, the optical lens 122, and the polarizer 123 in the 3D projecting device 120 are connected to different pivoting mechanisms 210 respectively. That is to say, in the 3D display system 300, angles between the displayer 121, the optical lens 122 as well as the polarizer 123 and the rotational base 110 are independently adjustable.

Figure 4B:
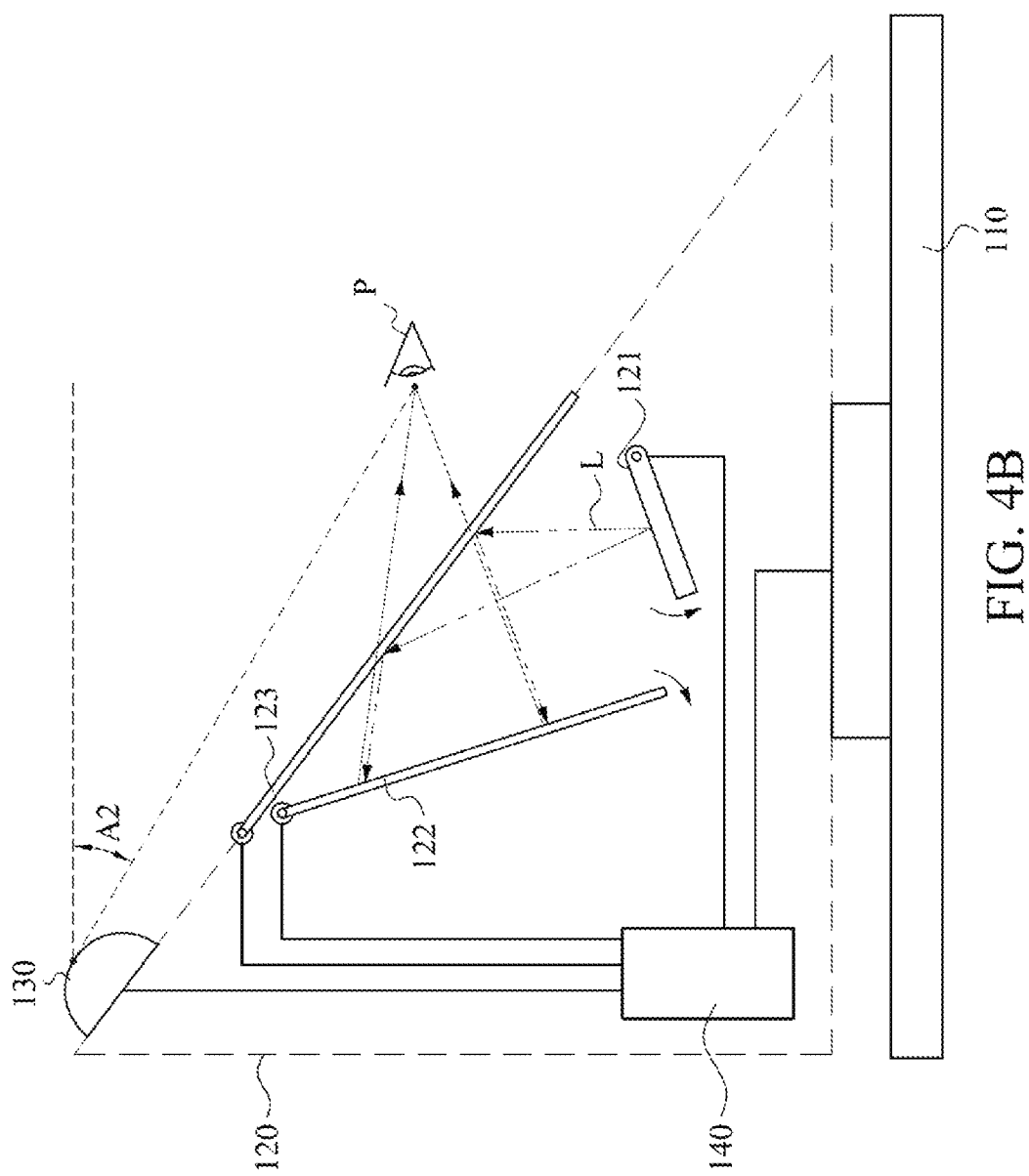
FIG. 4B is a schematic diagram of the 3D display system in FIG. 4A in another state.

Refer to FIG. 4B, which is a schematic diagram of the 3D display system 300 in FIG. 4A in another state. As shown in FIG. 4B, the displayer 121 is rotated counterclockwise and the optical lens 122 is rotated clockwise. The angle at which the light L is incident on the optical lens 122 is changed and the optical lens 122 is rotated accordingly, so that the angle at which the light L is incident on the optical lens 122 remains unchanged (the same as FIG. 4A). In this way, the light L is reflected back to the polarizer 123 along the path a path opposite to the incident path of the light L. As shown in FIG. 4B, the light L passes through the polarizer 123 and then reaches the viewer P, and the angle between the viewer P and the plane in which the image capturing device 130 locates is changed from the first elevation angle A1 to the second elevation angle A2. That is to say, the elevation angle of the 3D display system 300 is controlled by rotating the displayer 121 and the optical lens 122 while keeping the polarizer 123 still.

As shown in FIG. 4B, the 3D projecting device 120 detects a vertical height between the viewer P and the rotational base 110. The 3D projecting device 120 transmits height information to the controller 140, and the controller 140 controls the pivoting mechanisms 210 according to the height information to adjust angle relationships between the displayer 121, the optical lens 122, and the polarizer 123, so as to change the elevation angle of the 3D display system 300.

Based on the above, the 3D display system of the disclosure not only allows a viewer to view a 3D image in 360 degrees, but also adjusts an optimal elevation angle according to the viewer's height and observation posture (such as standing or squatting), providing an optimal effect for the viewer viewing the image.

The disclosure has been described above through examples and embodiments. It is to be appreciated that the disclosure is not limited to the embodiments disclosed. Instead, the disclosure encompasses various modifications and similar arrangements (including those apparent to persons of ordinary skill in the art). Therefore, the appended claims shall be interpreted in broadest sense to encompass all such modifications and similar arrangements.

What is claimed is:

1. A 3D display system, comprising:
   a rotational base;
   a 3D projecting device, comprising:
      a housing, rotatably disposed on the rotational base;
      a displayer, disposed in the housing and configured to emit light with a first light transport direction;
      an optical lens, disposed in the housing and configured to change the first light transport direction of the light into a second light transport direction;
      a polarizer disposed in the housing, the polarizer defining a triangular space together with the displayer and the optical lens, and configured to reflect the light with the first light transport direction and permitting the light with the second light transport direction to transmit therethrough; and
   at least one pivoting mechanism disposed in the housing and configured to drive each of the displayer, the optical lens and the polarizer to move relative to the housing;
   an image capturing device, disposed on the 3D projecting device; and
   a controller, electrically connected to the image capturing device, the rotational base, and the 3D projecting device.

2. The 3D display system according to claim 1, wherein the light emitted by the displayer passes through the polarizer, the optical lens, and the polarizer in sequence.

3. The 3D display system according to claim 1, wherein the image capturing device and the polarizer face toward the same direction.

4. The 3D display system according to claim 1, further comprising:
   a box, accommodating the displayer, the optical lens, and the polarizer therein;
   wherein the pivoting mechanism is pivotally connected to the box, electrically connected to the controller, and configured to simultaneously change positions of the displayer, the optical lens, and the polarizer relative to the housing.

5. The 3D display system according to claim 1, wherein the at least one pivoting mechanism comprises:
   a first pivoting mechanism, electrically connected to the controller and the 3D projecting device, and configured to change a position of the displayer relative to the housing.

6. The 3D display system according to claim 1, wherein the at least one pivoting mechanism comprises:
   a second pivoting mechanism, electrically connected to the controller and the 3D projecting device, and configured to change a position of the optical lens relative to the housing.

7. The 3D display system according to claim 1, wherein the at least one pivoting mechanism comprises:
   a third pivoting mechanism, electrically connected to the controller and the 3D projecting device, and configured to change a position of the polarizer relative to the housing.

8. The 3D display system according to claim 1, wherein the rotational base comprises a rotary column and the 3D projecting device is fixed on the rotary column.

9. The 3D display system according to claim 1, wherein the polarizer covers the displayer and the optical lens.

* * * * *